(12) United States Patent
Maranatha et al.

(10) Patent No.: US 10,964,031 B2
(45) Date of Patent: Mar. 30, 2021

(54) VIDEO ANALYSIS METHODS AND APPARATUS

(71) Applicant: INVISIRON PTE. LTD., Singapore (SG)

(72) Inventors: Yosua Michael Maranatha, Singapore (SG); Christopher Tay Meng Keat, Singapore (SG); Raymond Looi, Singapore (SG); Ashish Sriram, Singapore (SG)

(73) Assignee: INVISIRON PTE. LTD., Singapore (SG)

( * ) Notice: Subject to any disclaimer, the term of this patent is extended or adjusted under 35 U.S.C. 154(b) by 0 days.

(21) Appl. No.: 16/253,640

(22) Filed: Jan. 22, 2019

(65) Prior Publication Data

US 2019/0156492 A1 May 23, 2019

Related U.S. Application Data

(62) Division of application No. 15/000,418, filed on Jan. 19, 2016, now Pat. No. 10,217,226.

(30) Foreign Application Priority Data

Dec. 16, 2015 (SG) .......................... 10201510337R

(51) Int. Cl.
*G06K 9/00* (2006.01)
*G06T 7/246* (2017.01)
(Continued)

(52) U.S. Cl.
CPC .......... *G06T 7/246* (2017.01); *G06K 9/00718* (2013.01); *G06K 9/00744* (2013.01);
(Continued)

(58) Field of Classification Search
CPC .............. G06T 7/2046; G06K 9/00718; G06K 9/00771; G06K 9/4642; G06K 9/6212; G06K 9/6218
See application file for complete search history.

(56) References Cited

U.S. PATENT DOCUMENTS 7,639,840 B2 12/2009 Hanna et al.
7,667,596 B2 2/2010 Ozdemir et al.
(Continued)

FOREIGN PATENT DOCUMENTS

WO 2015001544 A2 1/2015

OTHER PUBLICATIONS

Zhu et al., "Context-Aware Activity Recognition and Anomaly Detection in Video", IEEE Journal of Selected Topics in Signal Processing, published Feb. 2013, vol. 7, No. I, pp. 91-101, [retrieved from internet Feb. 1, 2017] URL: http://ee.ucredu/-amitrc/publications/jstsp13.pdf>.

(Continued)

*Primary Examiner* — Duy M Dang
(74) *Attorney, Agent, or Firm* — Lerner, David, Littenberg, Krumholz & Mentlik, LLP

(57) ABSTRACT

Video analysis methods are described in which abnormalities are detected by comparing features extracted from a video sequence or motion patterns determined from the video sequence with a statistical model. The statistical model may be updated during the video analysis.

19 Claims, 8 Drawing Sheets

(51) Int. Cl.
*G06K 9/62* (2006.01)
*G06K 9/46* (2006.01)

(52) U.S. Cl.
CPC ....... *G06K 9/00771* (2013.01); *G06K 9/4642* (2013.01); *G06K 9/6212* (2013.01); *G06K 9/6218* (2013.01); *G06K 9/6262* (2013.01); *G06K 9/6292* (2013.01); *G06T 7/251* (2017.01); *G06K 2009/00738* (2013.01); *G06T 2207/20081* (2013.01); *G06T 2207/30232* (2013.01)

(56) References Cited

U.S. PATENT DOCUMENTS

| | | | |
|---|---|---|---|
| 8,619,135 | B2 | 12/2013 | Shellshear et al. |
| 8,724,891 | B2 | 5/2014 | Kiryati et al. |
| 8,744,124 | B2 | 6/2014 | Venkatesh et al. |
| 10,217,226 | B2 * | 2/2019 | Maranatha ......... G06K 9/00771 |
| 2006/0045185 | A1 | 3/2006 | Kiryati et al. |
| 2007/0279490 | A1 | 12/2007 | Zhou et al. |
| 2008/0123975 | A1 | 5/2008 | Otsu et al. |
| 2014/0003710 | A1 | 1/2014 | Seow et al. |

OTHER PUBLICATIONS

Hu et al., "A System for learning Statistical Motion Patterns", IEEE Transactions on Pattern Analysis and Machine Intelligence, publised Sep. 2006, vol. 28, No. 9, pp. 1452-1460, [retrieved from internet Feb. 2, 2017] URL:http://eprints.bbk.ac.uk/44 2/1 /Binder1.pdf>.
International Search Report for PCT/SG2016/050599 dated Feb. 3, 2017.
Extended European Search Report with Written Opinion for Application No. 16876166.6 dated Jul. 2, 2019, 11 pages.
Parvin et al, "Modeling traffic motion patterns via Non-negative Matrix Factorization," 2015 IEEE International Conference on Signal and Image Processing Applications (ICSIPA), Oct. 19, 2015, pp. 214-219, XP032869397.
Roshtkhari et al, "An on-line, real-time learning method for detecting anomalies in videos using spatio-temporal compositions," Computer Vision and Image Understanding, Oct. 1, 2013, pp. 1436-1452, vol. 117, No. 10, XP055411357.
Zhu et al., "Context-Aware Activity Recognition and Anomaly Detection in Video," IEEE Journal of Selected Topics in Signal Processing, Feb. 1, 2013, pp. 91-101, vol. 7, No. I, XP011488792.

* cited by examiner

VIDEO ANALYSIS METHODS AND APPARATUS

CROSS-REFERENCE TO RELATED APPLICATIONS

The present application is a divisional of U.S. patent application Ser. No. 15/000,418, filed on Jan. 19, 2016, which claims priority from Singapore Patent Application No. SG 10201510337R, filed Dec. 16, 2015, the disclosures of which are hereby incorporated herein by reference.

FIELD OF THE INVENTION

Embodiments of the present invention relate to video analysis. In particular, embodiments described herein relate to the detection of abnormal events in videos.

BACKGROUND OF THE INVENTION

Public infrastructure settings these days are feared to be more and more vulnerable to security threats. The world has suffered much loss of life and property due to terrorist incidents. In order to protect human lives, public infrastructure facilities such as rail and road transport and shopping malls from potential security threats, it has become imperative to build surveillance systems that can monitor a scene and automatically detect and report suspicious events. The importance of surveillance systems is evident from the increasing number of closed circuit television (CCTV) cameras we see in in train stations, airports, shopping malls, traffic junctions and streets our day-to-day life. For instance, it has been reported that United Kingdom has one of the largest camera network with over 4.2 m cameras this is approximately 1 for every 14 people.

Much of the content recorded from surveillance scenes are rarely screened and merely serve as record for forensic analysis. Moreover, searching for a specific occurrence in this enormous quantity of data amounts to looking for a needle in a haystack. A surveillance camera becomes more usable if it is packaged with intelligence to detect and report events in close to real time.

Video based surveillance systems are widely used to monitor sensitive areas for dangerous behavior, unusual activities and intrusion detection. This process generally involves humans monitoring a continuous stream of video from single or multiple sources looking to find such abnormal behavior. This process is highly inefficient given the rarity of occurrence of such abnormal events. Most attempts at automating this system require a set of predefined rules describing what sort of events are to be considered abnormal. Such rule based systems describe abnormal events using rules such as 'detect people crossing a virtual line'; 'detect any activity within a bounded region'; 'detect vehicles stopping in a region for a longtime'; etc. Defining rules specific to a scene requires a human to analyze the scene being monitored and create these rules. In addition to this, it is very difficult to create rules to describe most abnormal behavior like 'fight in a crowd' and 'a person loitering in a region with standard people movement'.

SUMMARY OF THE INVENTION

According to a first aspect of the present invention there is provided a method of identifying abnormal events in a video sequence. The method comprises: extracting features from the video sequence; determining an abnormality measure for each feature by comparing the extracted features with a statistical model; and identifying an abnormal event using the abnormality measure.

In an embodiment, the method further comprises discretizing the extracted features.

In an embodiment, the statistical model comprises a histogram indicating a frequency distribution of discretized features extracted from the video sequence and the abnormality measure is determined from the frequency distribution.

In an embodiment, the method further comprises updating die frequency distribution with the discretized extracted feature.

In an embodiment, the method further comprises pruning the updated frequency distribution if the updated frequency distribution exceeds a threshold number of entries.

In an embodiment, the method further comprises determining for a portion of the video sequence, a set of discretized features present in the portion of the video sequence and a frequency of occurrence in the portion of the video sequence of each discretized feature of the set of discretized features.

In an embodiment, the method further comprises determining an abnormality measure for the portion of the video sequence as a function of the abnormality measures for each of the discretized features and the frequency of occurrence of the discretized features.

In an embodiment, identifying an abnormal event using the abnormality measure comprises comparing the abnormality measure with a threshold and identifying an abnormal event when the abnormality measure is greater than the threshold.

In an embodiment, the method further comprises displaying to a user an indication of the location of the abnormal even on a frame of the video sequence.

In an embodiment, the method further comprises receiving a user indication of a set of discretized features and modifying the frequency in the frequency distribution of the indicated set of discretized features.

In an embodiment, the features comprise optical flow. Additionally or alternatively, the features may comprise color, and/or tracks. The use of tracks is described in more detail below. The abnormality measure may be measured by the weighted sum derived from the frequency of the tracks.

In an embodiment, the method further comprises detecting an event according to a pre-defined rule and wherein identifying an abnormal event comprises using the abnormality measure and the result of the pre-defined rule.

According to a second aspect of the present invention there is provided an apparatus for identifying abnormal events in a video sequence. The apparatus comprises a computer processor and a data storage device, the data storage device having a feature extractor module and an abnormality detector module comprising non-transitory instructions operative by the processor to: extract features from the video sequence; determine an abnormality measure for each feature by comparing the extracted features with a statistical model; and identify an abnormal event using the abnormality measure.

According to a third aspect of the present invention there provided a method of identifying abnormal events in a video sequence. The method comprises: extracting features from the video sequence; determining motion patterns from the extracted features; determining an abnormality measure for each motion pattern by comparing the motion patterns with a statistical model; identifying an abnormal event using the abnormality measure.

In an embodiment, the motion patterns comprise tracks indicating motion between frames of the video sequence. The tracks can be constructed without requiring any object level identification.

In an embodiment, the method further comprises quantizing the extracted features.

In an embodiment, the method further comprises updating the statistical model using the motion patterns.

In an embodiment, identifying an abnormal event using the abnormality measure comprises comparing the abnormality measure with a threshold and identifying an abnormal event when the abnormality measure is greater than the threshold.

In an embodiment, the statistical model comprises a set of clustered motion patterns.

In an embodiment, determining an abnormality measure for a motion pattern comprises identifying a set of clustered motion patterns of the statistical model closest to the motion pattern.

In an embodiment, the abnormality measure is a distance measure between the set of clustered motion patterns closest to the motion pattern and the motion pattern.

In an embodiment, the features are optical flow.

In an embodiment, the method further comprises detecting an event according to a pre-defined rule and wherein identifying an abnormal event comprises using the abnormality measure and the result of the pre-defined rule.

According to a fourth aspect of the present invention there is provided an apparatus for identifying abnormal events in a video sequence. The apparatus comprises: a computer processor and a data storage device, the data storage device having a feature extraction module; a motion pattern generation module and a classifier module comprising non-transitory instructions operative by the processor to: extract features from the video sequence; determine motion patterns from the extracted features; determine an abnormality measure for each motion pattern by comparing the motion patterns with a statistical model; and identify an abnormal event using the abnormality measure.

According to a yet further aspect of the present invention, there is provided a non-transitory computer-readable medium. The computer-readable medium has stored thereon program instructions for causing at least one processor to perform operations of a method disclosed above.

BRIEF DESCRIPTION OF THE DRAWINGS

In the following, embodiments of the present invention will be described as non-limiting examples with reference to the accompanying drawings in which.

DETAILED DESCRIPTION

Figure 1:
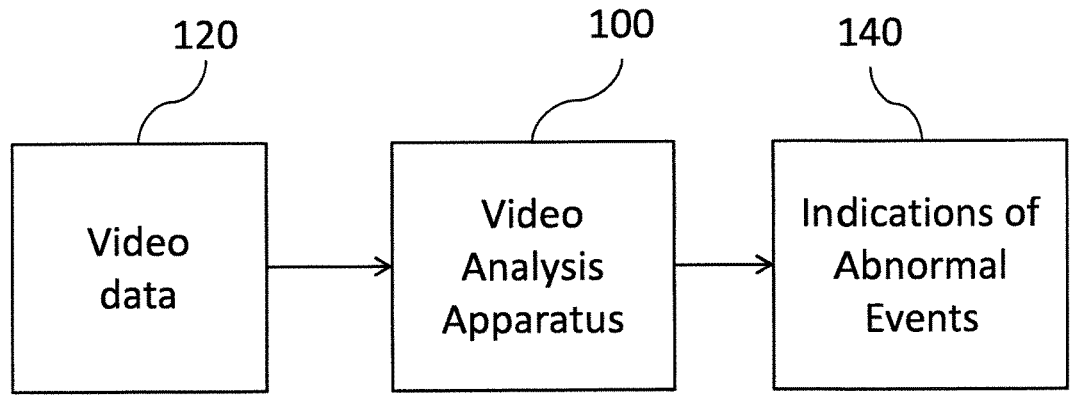
FIG. 1 shows a video analysis apparatus according to an embodiment of the present invention.

FIG. 1 shows a video analysis apparatus according to an embodiment of the present invention. The video analysis apparatus 100 receives video data 120 as an input and outputs indications of abnormal events 140. The input video data 120 comprises a plurality of frames of video data. In some embodiments, the video analysis apparatus 100 processes the input video data 120 in real time or near real time. In such embodiments, the video data 120 may be received directly from a video camera. As described in more detail below, in some embodiments, the analysis carried out by the video analysis apparatus 100 requires a scene, that is, a plurality of frames. Therefore, the analysis and the output of indications of abnormal events 140 may lag behind the input video data 120. In alternative embodiments, the processing carried out by the video analysis apparatus 100 may take place on pre-recorded video data.

The output of indications of abnormal events 140 may take the form of indications of times and locations on the input video data 120. In some embodiments, the indications may take the form of motion indications or tracks on the input video data 120. As described in more detail below, the processing carried out by the video analysis apparatus 100 involves learning based on an input video sequence. This learning process may continue during the analysis carried out by the video analysis apparatus 100. In some embodiments, a user may input rules or apply feedback to the output indications of abnormal events 140. The rules and feedback may be entered using a user input device such as a mouse, keyboard or touchscreen.

The video analysis apparatus 100 may be implemented as a standard computer having a processor configured to execute software stored on a storage device as a plurality of computer program modules operative by the processor to carry out the methods described in more detail below.

Figure 2:
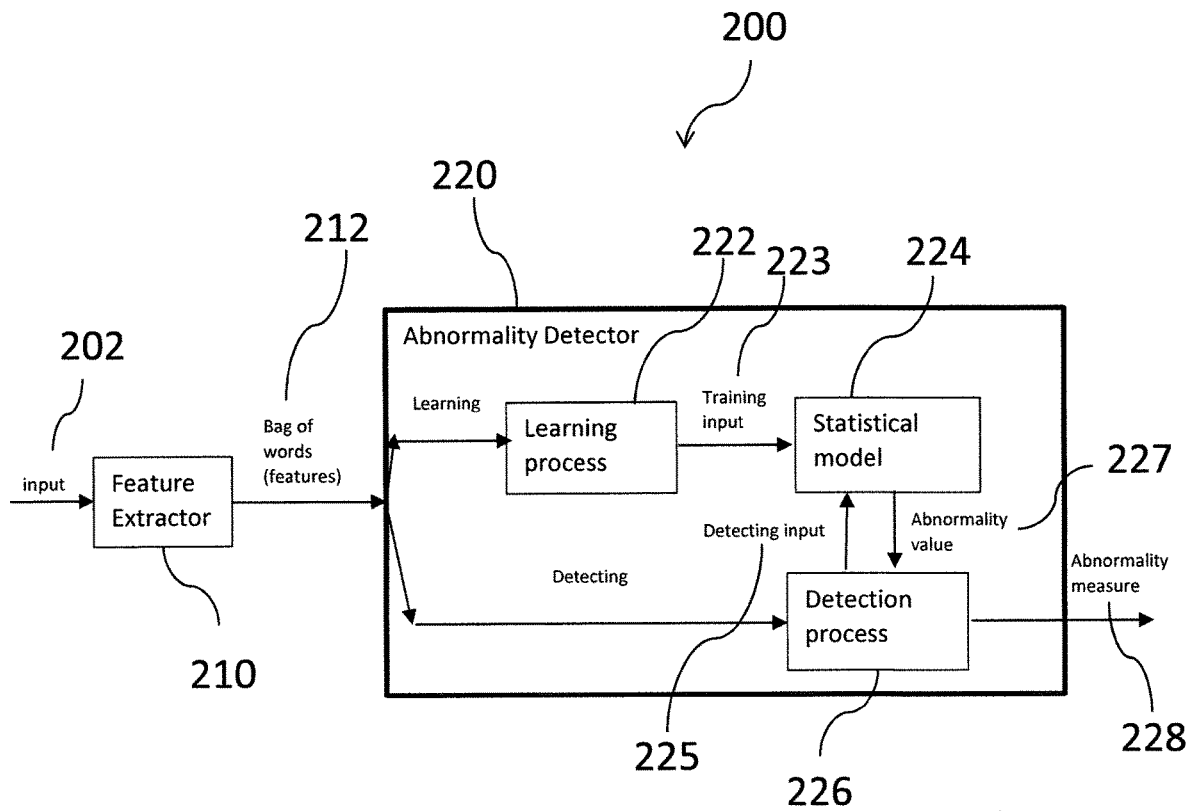
FIG. 2 shows the processing carried out in method of analyzing video data according to an embodiment of the present invention.

FIG. 2 illustrates the processing carried out in method of analyzing video data according to an embodiment of the present invention. As shown in FIG. 2, processing 200 includes two components: a feature extractor 210 and an abnormality detector 220.

In general, anomaly detection is the identification of item, event, or observation which does not fit into the expected pattern of the dataset. In the abnormality detector 220, the anomaly is defined quantitatively as item, event, or observation which occurred infrequently in dataset. In other words, it is assumed that something normal will occur more frequently as compared to something abnormal.

The abnormality detector 220 in this embodiment is an unsupervised anomaly detection algorithm that based on the frequency counting. The algorithm is light weight and fast enough to support real-time detection. Additionally, it has adaptive capability meaning that it can learn during detection and update itself to adapt with current condition.

The input 202 to the feature extractor 210 is a video sequence. Before this is fed into the abnormality detector 220, the input is transformed by the feature extractor 210. The feature extractor 210 describes each input scene which comprises a plurality of frames as a set of feature descriptors with a weight or score for each feature descriptor. In this embodiment, we describe the input is described as a bag of words 212 indicating a set of words and the frequency of each word in the set. The words should uniquely identify a descriptor and its frequency is proportional with the weight or score. Examples of words are discretized values of optical flow, colour or speed of motion, amongst other meta-data in general.

The main component of the abnormality detector 220 is a statistical model 224. The statistical model 224 is a histogram-like data structure which can gives information on the frequency distribution of the words. The statistical model 224 is initialised during a training phase using a training dataset. The learning process 222 is used to build the statistical model 224 from a training data set. The training dataset may be for example a few hours of video sequence. After learning, the model should know rough frequency distribution of the words and hence can give a reasonable abnormality measure during detection. The statistical model is also updated during the detection phase. This allows the statistical model 224 to adapt to the most recent situation. This takes into account the fact that in some cases, the frequency distribution of the words may change overtime.

During learning, the learning process 222 gets a stream of bags of words which are derived from the training dataset. For each bag of words, training inputs 223 comprising pairs of a word and its frequency are sent to statistical model 224 one by one by the learning process 222. When the statistical model 224 receives the pair of a word and its frequency, the histogram-like data structure in statistical model 224 is updated. This takes place by changing the frequency distribution accordingly. The particular word becomes more frequent as compared to other words.

During detection, the detection process 226 provides detecting inputs 225 to the statistical model 224. The detecting inputs 225 comprise pairs of words and the frequencies for the words. The statistical model 224 gives the detection process 226 an abnormality value 227 indicating how abnormal the word is. The detection process 226 calculates an abnormality measure for the bag of words using the abnormality value 227 for each word.

A number of possible functions to compute the abnormality value 227 in statistical model 224 are envisaged. As a general rule, a word with less frequency in the model should give more abnormality value. For each bag of words, their abnormality measure 228 is the weighted sum of all abnormality values of the words, where the weight is the word's frequency in the bag of words. Finally, to determine whether a particular input is abnormal or not, the abnormality measure 228 of the bag of words is compared with a pre-determined threshold value. If the abnormality measure 228 is higher than the threshold, then it is determined that the input is abnormal. Otherwise, the input is normal.

Furthermore, as illustrated in FIG. 2, the statistical model 224 is updated during the detection process 226. A similar updating method to that used during the learning process 222 is carried out, but the frequency of the word is multiplied by a small multiplier called DetectionMultiplier before sent into the statistical model 224. DetectionMultiplier usually has value in between 0 to 0.2. DetectionMultiplier is used to make sure that the model does not change too fast. This update during the detection process 226 gives the statistical model 224 an adaptive capability which enables it to adapt with the new situation during the detection process 226.

Figure 3:
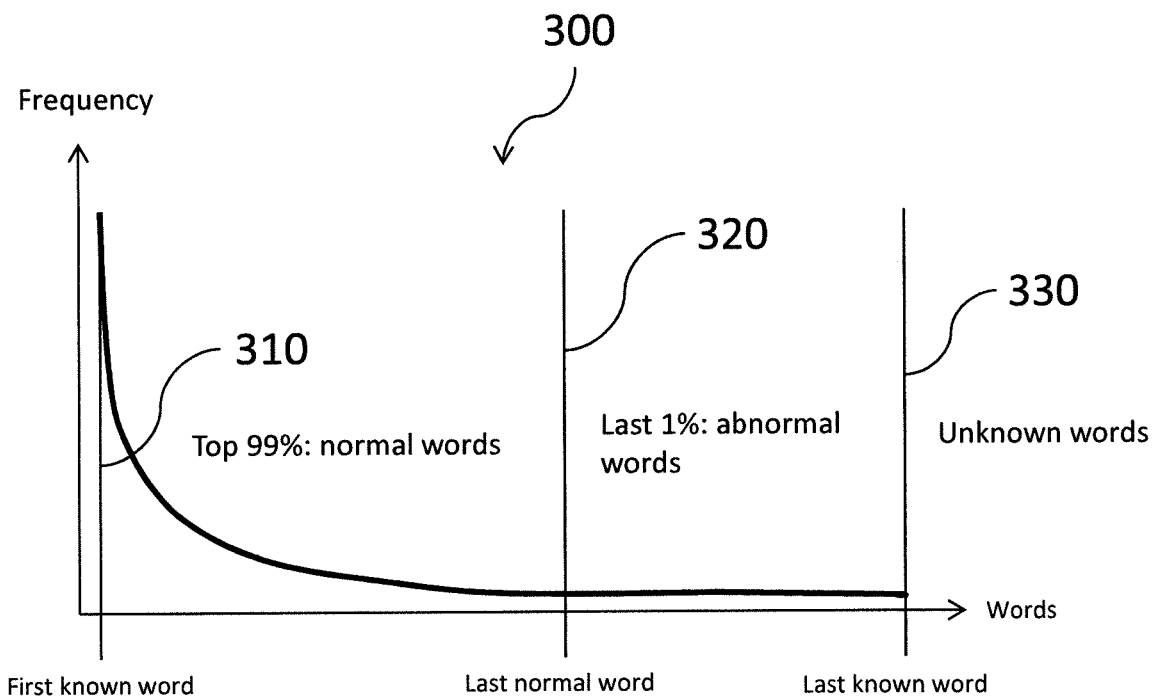
FIG. 3 shows a data structure of a statistical model according to an embodiment of the present invention.

FIG. 3 shows a data structure of a statistical model according to an embodiment. The data structure 300 is a histogram sorted in frequency. The data structure 300 stores locations for the first known word 310, the last normal word 320 and the last known word 330. These locations may be stored as indexes linking to words. The location of the last normal word 320 allows the statistical model to quickly determine whether a word is normal or not. Whenever the statistical model is updated, it should always maintain the sorted order of the histogram 300 and maintain the location of the last normal word 320.

Whether a word is normal or not is determined by a parameter called normalTh. The normalTh has value between 0 to 100%, it is the ratio of frequency of normal words compared to the total frequency. In the example shown in FIG. 3, normalTh is equal to 99%. This means that the top 99 percentile of the words are normal while the last 1 percentile is abnormal.

Figure 4:
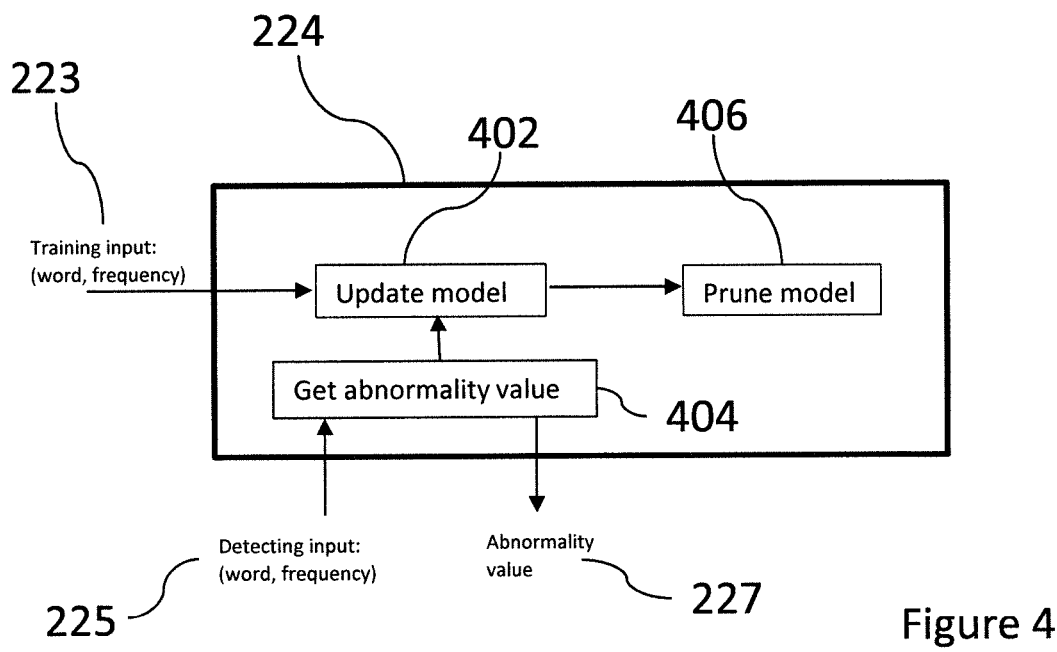
FIG. 4 shows the processes carried out using the statistical model in an embodiment of the present invention.

FIG. 4 shows the processes carried out using the statistical model 224. As shown in FIG. 4, there are three processes: update model 402, get abnormality value 404 and prune model 404. The update model 402 receives either a training input 223 or a detecting input 225 as an input. As discussed above both the training input 223 and the detecting input 225 comprise a combination of a word and the frequency of that word in a bag of words. The get abnormality value 404 process takes the detecting input 225 as an input and outputs an abnormality value 227. The prune model 406 process takes place after the update model 402 process has taken place.

The processing models are described in more detail below. The sorted histogram is implemented using a combination of the map data structure and a dynamic array that we name as WordToIndexMap and WordFrequencyArray respectively. The WordFrequencyArray contain pair of word and frequency and is sorted from the highest frequency to the lowest. The WordToIndexMap is a mapping between words and their rank in WordFrequencyArray. In this way, we can quickly find the word's rank and frequency. Moreover, swapping between neighbouring words can be done in O(1) time.

Other than the histogram, the data structure has three other variables to keep track the last normal word. These variables are named as LastNormalWord, TotalFrequency, and TotalFrequencyBeforeNormal. LastNormalWord stores the string of the last normal word; it is more rigorously defined as the last word from the top normalTh percentile. TotalFrequency is the sum of frequency of all words and TotalFrequencyBeforeNormal is the sum of frequency of all words before the last normal word. Using these 3 variables, we can efficiently keep track the last normal word whenever the model is updated or pruned.

Figure 5:
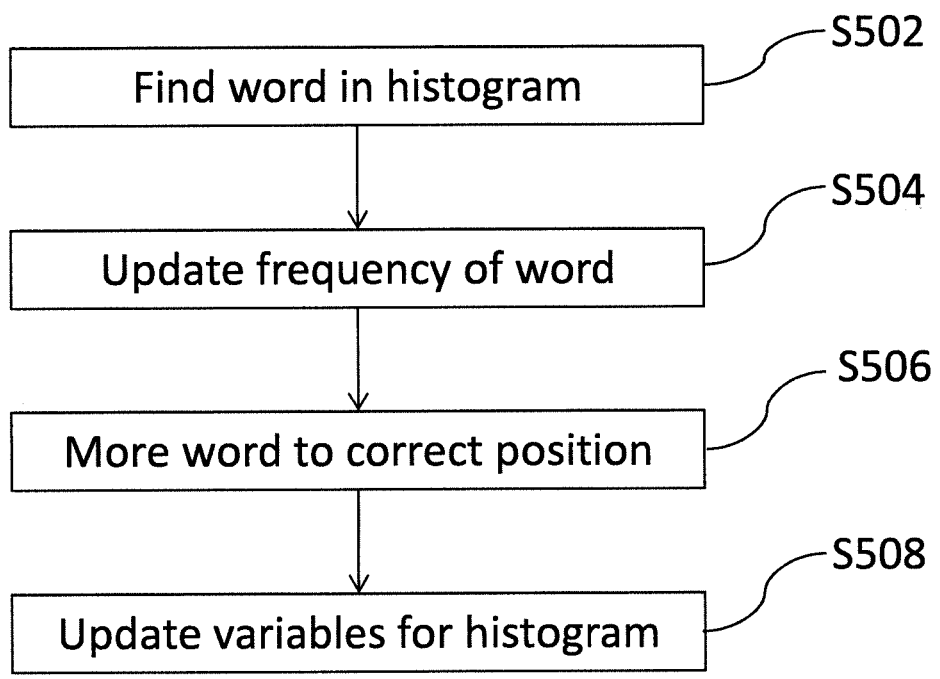
FIG. 5 shows a method implemented by the update model process in an embodiment of the present invention.

FIG. 5 shows a method implemented by the update model 402 process. As shown in FIG. 4, the inputs to the update model 402 process are a word w and its frequency f to be added to the statistical model 224. The process of updating the model is composed of adding a word to the histogram and continued by pruning the model. The process of pruning the model will be explained in more detail below.

In step S502, The statistical model 224 is updated by searching the location of word w in the statistical model 224 and increasing the frequency of that word the histogram by the input frequency, f. When a word w with frequency f is added into the histogram, what we want is to increase the frequency of the word w in the histogram by f while maintaining the sorted order of the histogram and the location of the last normal word with its helper variables. The first thing we need to do is to find the index of the word w in WordFrequencyArray by using WordToIndexMap.

In step S504, we use the index to add the frequency f to the correct element in WordFrequencyArray.

In step S506, we move word w by repeatedly swapping it to its neighbour until it gets into the correct position. This ensures that the histogram is in sorted order.

After the histogram is properly ordered, we still need to maintain some variables such as TotalFrequency, TotalFrequencyBeforeNormal, and LastNormalWord. These variables are updated in step S508. We can update TotalFrequency by adding the incoming word's frequency, f, to its value. To update TotalFrequencyBeforeNormal and LastNormalWord, 3 steps are carried out. In step one we keep the value of the LastNormalWord and update TotalFrequencyBeforeNormal to be the sum of frequency of all words before the (non-updated) LastNormalWord. In the next step, we update the LastNormalWord to make sure that it really is the last normal word or the last word from the top normalTh percentile. This update is done by comparing the ratio between TotalFrequencyBeforeNormal and TotalFrequency with normalTh then, if needed, we replace LastNormalWord with its neighbouring word. Last, we update TotalFrequencyBeforeNormal if the LastNormalWord is changed in the previous step.

Pseudo code for update model is set out below:

There are three parameters that are used for pruning the model: MaxTotalFrequency, MaxNumWord, and ReductionFactor. If the total frequency of the model is more than MaxTotalFrequency, then the statistical model will be pruned by scaling down the frequency of all words by ReductionFactor times. The MaxNumWord indicates the maximum number of different word allowed in the statistical model. If the number of word become more than MaxNumWord, then the word with smallest frequency will keep being removed until the number of word is equal to ReductionFactor multiplied by MaxNumWord.

In general, it is not good if the histogram is able to grow arbitrarily large since it can affect the performance of the system. Therefore, we employ two types of pruning to keep the size of the histogram reasonable. First, we limit the frequency size by scaling down the frequency of each word in the histogram. This is useful to prevent the loss of accuracy from floating point precision. Secondly, we limit the number of word by removing words with small frequency. A large number of words may cause the system to slowdown; therefore it is important to control the number of words in the histogram.

In one embodiment, we use three parameters to control the pruning mechanism. These parameter are ReductionFactor, MaxTotalFrequency, and MaxNumWord. The ReductionFactor is a number between 0 and 1 that represent the factor in which we reduce the size after pruning. MaxTotalFrequency and MaxNumWord are parameters indicating the upper bound of TotalFrequency and number of words in histogram respectively.

```
function get_correct_position(word w)
begin
    index <- WordToIndexMap[w]
    if (WordFrequencyArray[index].frequency > WordFrequencyArray[index-1].frequency)
    begin
        tempWord <- WordFrequencyArray[index-1].word
        swap(WordToIndexMap[w], WordToIndexMap[tempWord])
        swap(WordFrequencyArray[index], WordFrequencyArray[index-1])
    end
end
function add_to_histogram(word w, frequency f)
begin
    if ( w in WordToIndexMap )
    begin
        index <- WordToIndexMap[w]
        WordFrequencyArray[index].frequency <- WordFrequencyArray[index] + f
    else
        WordToIndexMap[w] <- WordFrequencyArray.size( )
        WordFrequencyArray.push_back((w,f))
    end
    get_correct_position(w)
    TotalFrequency <- TotalFrequency + f
    // Function to maintain the LastNormalWord, TotalFrequencyBeforeNormal.
    // It can be done in O(1) time
    maintain_last_normal_word( )
end
function update_model(word w, frequency f)
begin
    add_to_histogram(w,f)
    prune_model( )
end
```

The prune model 406 process will now be described. After statistical model 224 is updated, the statistical model will always grow larger in term of total frequency (vertically) and number of word (horizontally). This means that the statistical model can grow arbitrarily large. To prevent this, the statistical model 224 is pruned when it exceeds a certain size.

The process of scaling down the frequency is triggered when the TotalFrequency is bigger than MaxTotalFrequency. Once triggered the process will multiply the frequency of each word in the histogram by the ReductionFactor. After that, TotalFrequency and TotalFrequencyBeforeNormal will be multiplied by ReductionFactor as well.

The second pruning process is started when the number of word in the histogram is larger than MaxNumWord. In this process, we keep removing the word with smallest frequency from the histogram until the number of word in the histogram is less or equal to MaxNumWord*ReductionFactor. While removing the word from the histogram, it will also update and manage TotalFrequency, TotalFrequencyBeforeNormal and LastNormalWord to make sure they have the correct value.

Pseudo code for prune model is set out below:

```
function scale_down_histogram( )
begin
    for all x in WordFrequencyArray
    begin
        x.frequency <- x.frequency * ReductionFactor
    end
    TotalFrequency <- TotalFrequency * ReductionFactor
    TotalFrequencyBeforeNormal <- TotalFrequencyBeforeNormal * ReductionFactor
end
function prune_num_word( )
begin
    while ( WordFrequencyArray.size( ) > MaxNumWord * ReductionFactor )
    begin
        TotalFrequency <- TotalFrequency - WordFrequencyArray.back( ).frequency
        WordFrequencyArray.pop_back( )
    end
    maintain_last_normal_word( )
end
function prune_model( )
begin
    if (TotalFrequency > MaxTotalFrequency)
    begin
        scale_down_histogram( )
    end
    if (WordFrequencyArray.size( ) > MaxNumWord)
    begin
        prune_num_word( )
    end
end
```

The processing carried out by in the get abnormality value 404 will now be described. During detection, we want to get the abnormality value of a word. Before computing the abnormality value, the get abnormality value 404 process will check whether or not the word is normal by comparing its location with the last normal word location. If the word is normal, then the abnormality value is zero. Otherwise, an abnormality value will be computed by a function called compute_abnormality_value which takes a word and return abnormality value as a result.

The function compute_abnormality_value can be varied according to different embodiments. For example, a mathematical formula may be used to compute the abnormality value. Other than the mathematical formula to compute the abnormality value, it may also vary because of the usage of previous result; for example, we might want to use the previous abnormality value to compute the current abnormality value. In general, the word with less frequency should contribute more abnormality value and the correlation between previous and current abnormality value should be non-negative As shown in FIG. 4, the get abnormality value 404 returns the abnormality value of a word during the detection processing and the statistical model is updated. As described above, the get abnormality value 404 process gives zero abnormality value for a normal word, otherwise it will use compute_abnormal_value function to compute the abnormality value.

The compute_abnormal_value function is not a fixed function. We can change the function such that it suits the domain where the statistical model is used. In an implementation, we use a function that grows exponentially with respect to the ratio between the word's frequency and the last normal word's frequency. The rate of exponential growth is controlled by setting the value of a constant (Constant_1).

Pseudo code for get abnormality value is set out below:

```
function is_abnormal(word w)
begin
    return WordToIndexMap(w) > WordToIndexMap(LastNormalWord)
end
function compute_abnormal_value(word w)
begin
    if (not w in WordToIndexMap)
    begin
        return 1.0
    end
    index <- WordToIndexMap[w]
```

-continued

```
    f <- WordFrequencyArray[index].frequency
    lastNormalIndex <- WordToIndexMap[LastNormalWord]
    lastNormalFrequency <- WordFrequencyArray[lastNormalIndex].frequency
    return exp( - Constant_1 * f / lastNormalFrequency )
end
function get_abnormality_value(word w, frequency f)
begin
    result <- 0.0
    if ( is_abnormal(w) )
    begin
        result <- compute_abnormal_value(w)
    end
    update_model(w,f)
    return result
end
```

An embodiment of a video analysis method and apparatus for detecting abnormalities in video camera surveillance will now be described. In this embodiment we chose optical flow as the feature. The feature extractor receives a stream of frames from the video. Optical flow is generated on each frame and encoded into a word with format: "x, y, direction". The x and y are the coordinates of the pixel that have the optical flow. To reduce the word spaces, we discretized x and y into the nearest smaller multiple of 8, i.e. 34 will be discretized to 32. The direction is the angle of the optical flow with respect to the y axis, it is discretized into 8 possible directions (consecutive directions differ by 22.5 degree).

The feature extractor will output one bag of words for every 5 frames it received. The bag of words is basically a vector of pair of word with its frequency, where the frequency is just how many times such word appear in the 5 frames. Once the bag of words is received, they are fed into the statistical model. We can either feed the bag of words to learning process to build the model, or feed the bag of words into detection process for a real time detection.

With this feature extractor, the statistical model can be used to detect events with unusual optical flow. If the movement on the video camera scene is well structured, then the statistical model can be used to detect abnormality which is not following the structure. For example, consider a scene where the camera is looking at highway where pedestrians rarely jaywalk. In this case, the normal optical flow would be the movement of vehicles along the road. If there is a person jaywalking, it will be detected as abnormal since it will produce optical flow perpendicular to the movement of the vehicles.

We use compute_abnormal_value functions as described above. With this, there are 5 parameters that we need to decide which are normalTh, MaxTotalFrequency, MaxNumWord, Constant_1, and DetectionMultiplier (from the detection process).

Before detection, the statistical model is build learning from 2-3 hours of video from the camera view. With this, the initial model will roughly know the general pattern of the optical flow in the camera view. Having the initial model, statistical model can be used for online detection on the video streams from the camera.

In the beginning, the detection result might not be good because the initial model does not get enough information from the video used for learning. Fortunately, the statistical model is adaptive and it will learn during detection as well. Therefore, the statistical model will get better and better while doing detection and as a result the detection will also get better. Moreover, adaptive capability enables the model to adapt if the normal behaviour in the camera view is changing.

The processing described above is very light-weight in terms of requirements and fast.

In certain situations, the user might want to provide feedback to the statistical model. As abnormalities are contextual, certain users might want to designate certain motions (which correspond to a set of words) as being normal or abnormal. The embodiments described above provide a very direct way of giving this feedback.

In an embodiment, users are able to provide feedback in the form of a user interface where the user highlights the area of the camera view of interest. The areas highlighted are directly mapped to its corresponding words. The statistical model 224 is then updated with the add_to_frequency function. If the highlighted zone is to be designated as normal, a positive frequency number is passed as parameter to the add_to_frequency function. For the opposite case, a negative frequency number is used instead.

Figure 6:
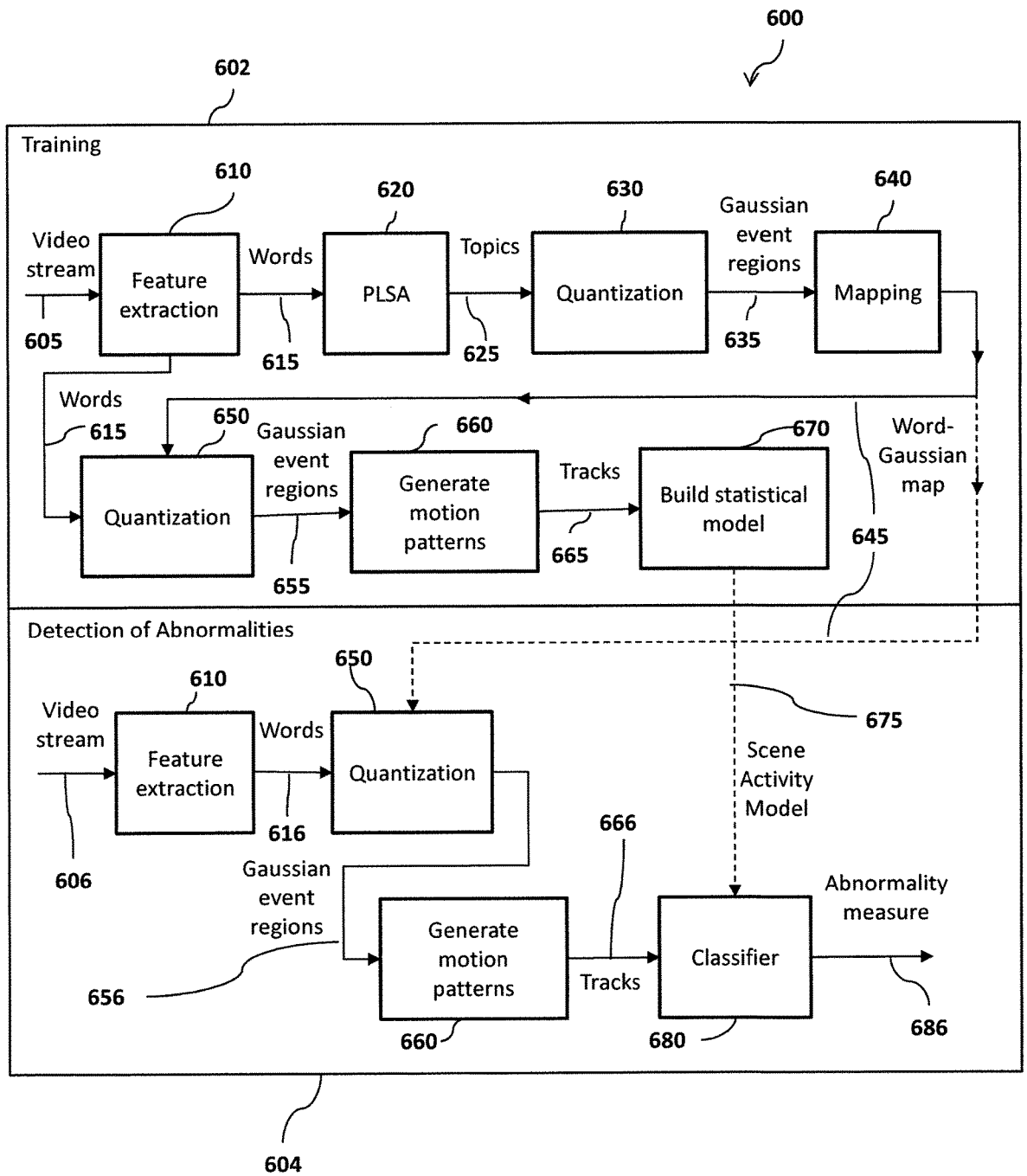
FIG. 6 shows processing units of an apparatus for detecting abnormalities in a video sequence according to an embodiment of the present invention.

FIG. 6 shows processing units of an apparatus for detecting abnormalities in a video sequence according to an embodiment of the present invention.

As shown in FIG. 6, the processing 600 comprises a training phase 602 and a detection phase 604. Some of the processing units of the training phase 602 also occur in the detection phase 604, where this is the case, like reference numerals are used.

In the training phase 602, a scene track model is learned. In the detection phase 604, this scene track model is used to detect abnormal events in a video stream. As shown in FIG. 6, a training video stream 605 is input into the training phase 602, and a test input video stream 606 is input into the detection phase 604.

In the training stage 602, we intend to model all activities occurring in the training video stream 605. A feature extraction module 610 extracts basic features that describe regions of activity in the scene in space and time from the input video stream 605. The input video stream 605 comprises a series of frames or images. The basic features which are referred to as words 615 are pixels or super-pixels with motion information. The basic features (words 615) are too numerous to be used for modelling. Thus we introduce multiple stages of quantization to decrease the sample space.

A Probabilistic Latent Semantic Analysis (PLSA) module 620 groups words that appear together in time to generate topics 625 using a generative model. Further grouping in space is performed in a topic quantization module 630 in which each topic 625 is represented using a small set of Gaussians that model individual activity regions 635 that appear in a small space and time frame. A mapping module 640 maps all words to the Gaussian event regions 635. A word-Gaussian map 645 is output by the mapping module 640.

The word-Gaussian map is used to quantize words 615 in a Quantization module 650 which generates a mapping of words to a lower dimensional Gaussian space defined by a set of Gaussian event regions 655. Once the mapping is established and words are quantised, we can model the activities/motion patterns seen in the live video. A generate motion patterns module 660 generates motion patterns in the form of tracks 665. Each video frame generates a set of Gaussians and these are used to build tracks 665 that model activities in the scene. This track generation process can generate few hundred thousand tracks from an hour of video. A build statistical model module 670 uses a clustering process to generate a scene activity model 675 that models the system using fewer tracks. For each scene which comprises frames from a few seconds of video, tracks are generated and clustered to get a reduced set of merged tracks. The frequency count of these tracks model the distribution of activity in the scene.

At the end of training, we normalize the frequency count of merged tracks to get a probability model of activity distribution in the video. This model is the Scene Activity model 675.

In the detection phase 604, abnormalities are detected in a test input video stream 606. The pipeline is similar to the track generation process in the training phase 602. The feature extraction module 610 extracts words 616 from the test input video stream 606. These words 616 are mapped to Gaussian event regions 656 by the word quantisation module 650. The generate motion patterns module 660 generates tracks 666 from the Gaussian event regions 656. These tracks 666 are referred to as test tracks.

Once a test track is generated, it is compared with all of the merged tracks in the scene activity model. These tracks are referred to as train tracks. A classifier block 680 compares the test tracks with all of the train tracks and finds the most similar track match. The classifier module 680 then determines whether the newly seen test track is abnormal or not based on a similarity value. Tracks that are found to be abnormal represent abnormal events occurring in the real world and such occurrences can be made to trigger alarms.

The training phase 602 and the detection phase 604 of an embodiment will now be described in more detail.

The training phase 602 aims to extract the most prominent activities seen in the training video stream 605 and represent them using tracks 665 formed by a series of Gaussians. The Gaussians model the position and variance of different local instances of the activity.

The feature extraction module 610 is used to extract basic features from the raw video which comprises a series of frames/images. The basic features or words 615 describe regions of activity in the scene in space and time. The basic features (words 615) are pixels/super-pixels with motion information. The feature extraction module 610 may be implemented with any feature extraction method that gives local position and motion information. Examples of possible feature extraction methods that may be used are block-matching, phase correlation, optical flow and the Luckas Kanade Tracker.

The words 615 are in (x; y; o) format, where x and y represent the position and o represents the direction of motion. Each word is represented as a 4D vector (x; y; dx; dy) where dx and dy represent the orthogonal components of the direction of motion o.

Figure 7:
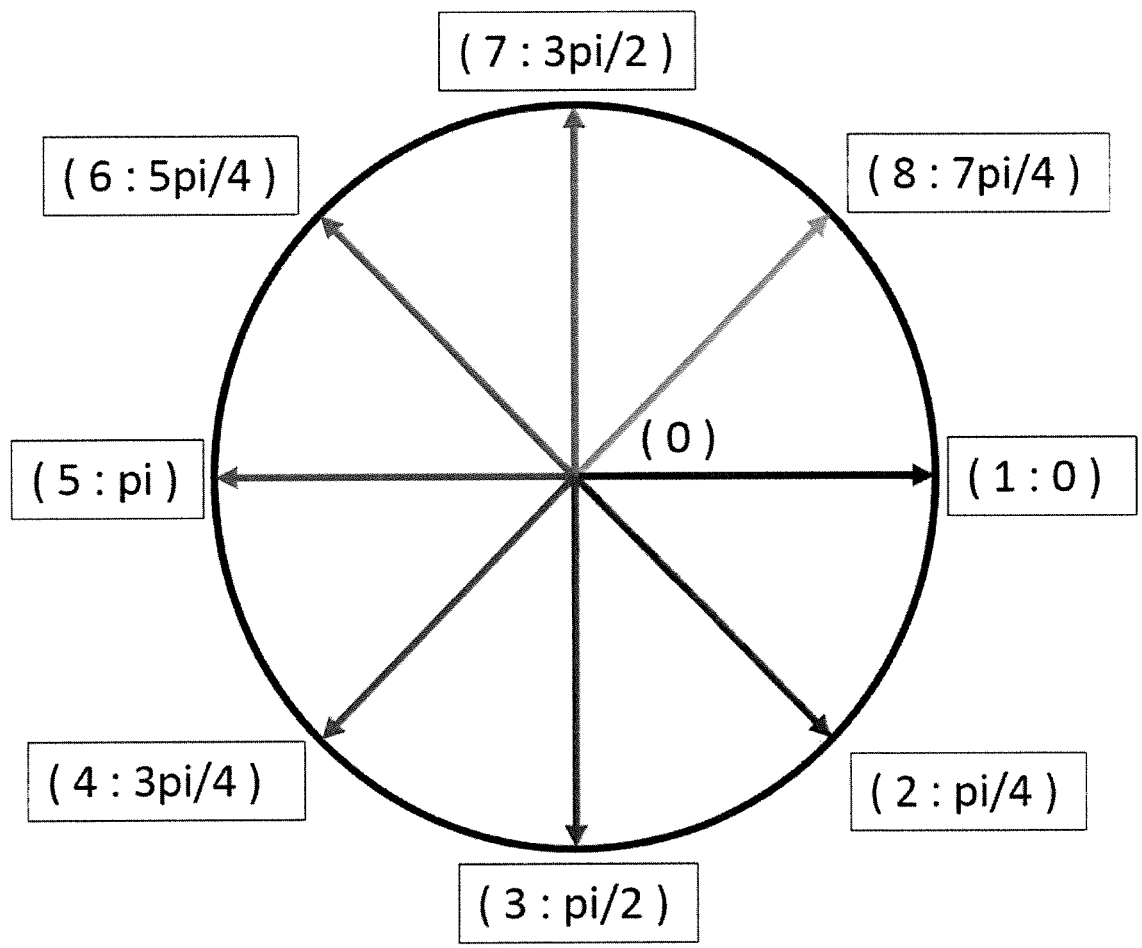
FIG. 7 shows the discretization of the direction of motion in an embodiment of the present invention.

The direction of motion o is discretized. FIG. 7 shows the discretization of the direction of motion. As shown in FIG. 7, the direction of motion is discretized into 9 bins. Bin 0 represents no motion and bin 1 to bin 8 represent motion in the directions shown in FIG. 7.

The probabilistic latent semantic analysis (PLSA) block 620 implements a generative model which specifies sampling rules on the sampling space of words. If each word is represented by w and each doc (group of frames) is represented by d, we intend to get a set of topics z that introduces a conditional independence between w and d. These topics should tend to group words that appear together.

The joint distribution of the 3 variables (w,z,d) can be written as:

$$P(w, z, d) = P(d)P(w|z)P(z|d)$$

$$P(w, d) = P(d)\sum_{z=1}^{N_z} P(z|d)P(w|z)$$

Where $N_z$ is the total number of topics. The word distribution P(w|z) and topic distribution P(z|d) are estimated iteratively using maximum likelihood principle. Optimization is conducted using expectation maximization (EM) algorithm. The EM procedure starts by randomly initializing the parameters. In the expectation step, the posterior distribution of the topic variable is calculated as:

$$P(z|w, d) = \frac{P(w|z)P(z|d)}{\sum_{z'=1}^{N_z} P(w|z')P(z'|d)}$$

In the maximization step, the model parameters are estimated as:

$$P(w|z) \propto \sum_{d=1}^{D} n(w, d)P(z|w, d)$$

$$P(z|d) \propto \sum_{w=1}^{N_w} n(w, d)P(z|w, d)$$

The word distribution P(w|z) tends to cluster words that occur at the same time. This is used as basis for determining regions of activity in the scene in further steps.

PLSA ensures that the words in a topic are not highly scattered. But it is possible that a topic models more than one spatial region or more than one direction of motion. Therefore, there can also be multiple topics modelling the same region, adding redundant information. Further, we need a discrete representation of activity regions in the scene to build motion patterns in the future. Therefore, the quantization block 630 is included in the processing to provide a discreet representation of the scene.

The topic quantization module 630 clusters topics. The clustering is performed in 2 stages, namely Intra topic clustering and Inter topic clustering to get a discrete representation of activity regions in terms of Gaussians. The Gaussians N~($\mu$, $\Sigma$) are in 4D space (x; y; dx; dy). The mean $\mu$ represents the average position of the region in (x,y) and average direction of motion in (o—split into orthogonal components dx, dy). The covariance $\Sigma$ which is a 4×4 matrix represents the change in position/direction of words within the Gaussian and their relationships.

A topic can model multiple simultaneous activities occurring at different regions or having different directions of motion. Intra topic clustering is used to separate these individual activities within a topic. We intend to represent each topic using a small set of Gaussians that model individual activity regions.

Each topic z is associated with a probability density function (PDF) given by: P(w|z), $\forall w \in W$. Each w represents a 4D point in (x; y; dx; dy) space.

A Gaussian Mixture Model (GMM) with a presumed maximum number of Gaussians K that can represent all significant activity regions is fitted to each topic by sampling points in 4D space from P(w|z) for each z. The K Gaussians are fitted to each topic using Expectation Maximization (EM). The GMM probability density function is given by:

$$P(w|\theta) = \sum_{k=1}^{K} \alpha_k p_k(w|z_k, \mu_k, \Sigma_k)$$

Where $p_k(w|z_k,\mu_k,\Sigma_k) \sim N(\mu_k,\Sigma_k)$ are individual Gaussian components; $z=(z_1, z_2, \ldots z_k)$ are K dimensional latent indicator variables with only one of the $z_i$ equal to 1 and the rest 0. This represents which mixture component 1, 2, ... K generated w; $\alpha_k = p(z_k)$ are mixture weights that sum to 1; and $\theta = (\alpha_1 \ldots \alpha_k, \mu_1 \ldots \mu_k, \Sigma_1 \ldots \Sigma_k)$.

The EM algorithm starts with a random initialization for all $(\mu_k,\Sigma_k)$ and proceeds as an iterative process switching between an expectation (E-step) and maximization (M-step) routine.

The E-step computes the uncertainty about which component k produced $w_i$ given $(\mu_k,\Sigma_k)$:

$$\beta_{ik} = p(z_{ik} = 1 | w_i; \theta) = \frac{p(w_i|z_k;\theta)\alpha_k}{\sum_{k=1}^{K} p(w_i|z_k;\theta)\alpha_k}$$

for, 1<k<K components and 1<i<N words.

The M-step computes the mixture components for the given words $w_i$ with the above mapping $\beta_{ik}$:

$$\alpha'_k = \frac{N_k}{N}$$

where, $N_k$ represents the number of words associated with component k $$\mu'_k = \frac{\sum_{i=1}^{N} \beta_{ik} w_i}{N}$$

$$\Sigma'_k = \frac{\sum_{i=1}^{N} \beta_{ik}(w_i - \mu'_k)(w_i - \mu'_k)^T}{N}$$

Each topic z is now represented by a K component GMM:

$$G = \sum_{j=1}^{K} g_j$$

Where $g_j \sim N(\mu,\Sigma)$.

Hierarchical clustering is used to reduce the Gaussians. For each topic, reject Gaussians with very low weight are rejected. Also topics with very high covariance (distributed noise) or very low covariance (single pixels) are rejected to get a list of valid Gaussians representing each topic z given by: $g_j \in G$, $1 < j < M$, $M \leq K$.

The Gaussians $g_j$ are clustered using hierarchical clustering based on Kullback-Leibler (KL) divergence between Gaussians as distance measure. This is carried out as follows:

1. Get proximity matrix (M×M) in distance $M_{xy}$ and in direction $M_{dxy}$ between $g_j$ for each topic. Each GMM cluster G is sampled. For each Gaussian $g_i$ in the GMM given by:

$$G = \sum_{i=1}^{n} w_i g_i$$

$n_i$ samples are drawn, $n_i = N \times w_i$ where N is total number of samples. The KL distance between 2 sampled distributions $G_1$, $G_2$ is given by $d_{KLXY}(G_1, G_2)$:

$$d_{KLAS}(G_1, G_2) = \sum_i G_1(i) \ln \frac{G_1(i)}{G_2(i)}$$

$$d_{KL} \frac{d_{KLAS}(G_1, G_2) + d_{KLAS}(G_2, G_1)}{2}$$

$$d_{KLXY} = \frac{1}{\pi}\left[\arctan(\log_{10}(d_{KL})) + \frac{\pi}{2}\right]$$

For valid $G_1$ and $G_2$, $d_{KL} \in (0, +\infty)$. Thus the $d_{KLXY}$ function is used to reduce the range to (0,1). Each element of the proximity matrix $M_{xy}(p,q)$ is given by $d_{KLXY}(G_p, G_q)$. Similarly $M_{dxy}$ is obtained using (dx, dy) components.

2. For all (p, q) in $M_{xy}$ and $M_{dxy}$:
   IF($M_{xy}(p, q) > xy_{Thresh}$ and $M_{dxy}(p, q) > dxy_{Thresh}$):
   group Gaussians/GMMs into one GMM ($G'_p = w_p G_p + w_q G_q$).
   The thresholds are set depending on what resolution you intend to have. For scenes where cameras have a close-up view, lower thresholds are used, which will result in representing large objects with fewer Gaussian components. For scenes where cameras are monitoring activity from a longer distance, higher resolution is required to isolate different activities. In such cases, higher thresholds are used to get more Gaussian components.

3. Repeat 1. & 2. until no more merges are possible in 2.

4. Each topic is represented as a reduced set of GMMs $G'_j$. Each $G'_j$ is re-sampled and a single Gaussian $h_j$ is fitted to it. Now, each topic is represented as a set of Gaussians $h_j \sim N(\mu_j,\Sigma_j)$.

Since there can also be multiple topics modelling the same region with a high degree of overlap this adds redundant information. We use inter topic clustering to reduce this redundancy and to model the entire scene using a set of well distributed Gaussians.

The Gaussians may be clustered with direction of motion as follows. The Gaussians are sorted by direction of motion. The direction of motion of all Gaussians generated in the previous stage is quantized. If |dx| and |dy| are both too small, the value is set to zero; the rest are rounded off to the nearest direction of motion shown in FIG. 7. The Gaussians are grouped into bins. Within each bin, Gaussians that have higher percentage of overlap are merged. The decision to merge or not to merge 2 Gaussians is based on the ridge ratio $r_{val}$ between them, which is calculated as follows:

For all $\alpha \in [0,1]$ and $\beta = 1-\alpha$, the ridge line is given by:

$$r(\alpha) = [\beta \Sigma_1^{-1} + \alpha \Sigma_2^{-1}]^{-1}[\beta \Sigma_1^{-1} \mu_1 + \alpha \Sigma_2^{-1} \mu_2]$$

$$e(\alpha) = N(r(\alpha), \mu_1, \Sigma_1) + N(r(\alpha), \mu_2, \Sigma_2)$$

$$S_{max} = \text{maxima}(e(\alpha))$$

$$S_{min} = \text{minima}(e(\alpha))$$

$$S_{max2} = \max(S_{max} - \max(S_{max}))$$

$$S_{min} = \min(S_{min})$$

where $S_{max}$ and $S_{min}$ are sets of all maxima and minima of the elevation plot function $e(\alpha)$.

The ridge ratio is given by the ratio of global minima and the second highest maxima. If it is low then the 2 Gaussians are similar and can be merged (i.e. the elevation plot is almost flat). Else the Gaussians are too distinct and cannot be merged.

$$r_{val} = \begin{cases} -\log_{10}\left(\dfrac{S_{min}}{S_{max2}}\right) & \text{if } S_{max2}, S_{min} \text{ exists} \\ 0 & \text{otherwise} \end{cases}$$

Gaussians are merged by hierarchical clustering starting with the Gaussian pair with least ridge ratio. The merged Gaussian is obtained by sampling points from the 2 Gaussians and fitting a single Gaussian on to the sampled data points.

The function of the mapping module 640 in an embodiment will now be described. If a video with resolution 640×480 is divided into super pixels of size 8×8 pixels, then each frame is made up of 80×60 super pixels. With 9 direction levels, a total of 80×60×9=43200 words are possible, which is a large number to be used as basic units to build tracks.

As described above, a quantized representation of the scene is generated using PLSA-GMM. The mapping module 640 maps the raw features (words) to the quantized space (Gaussians). This will reduce the feature space to a few hundred Gaussians. However, there can be words that are not seen during training that may appear during testing. These unseen words are highly likely to not map very well to Gaussians generated from PLSA-GMM. Thus we need a default Gaussian grid to map the unseen space.

Figure 8A:
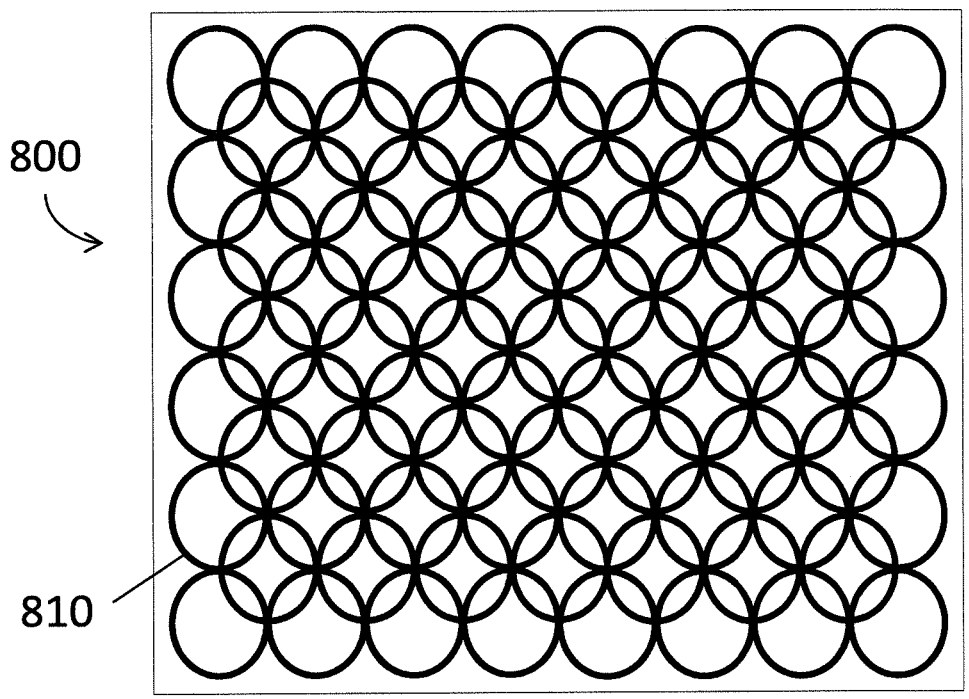
FIGS. 8a and 8b show examples of default Gaussian grids used in embodiments of the present invention.

FIG. 8a shows an example of a default Gaussian grid. The Gaussian grid 800 comprises a plurality of Gaussians 810 that span the entire frame. All Gaussians in the grid have the same covariance. Each grid is made up of 2 layers. The layers have a position offset of 1 standard deviation of an individual Gaussian, such that every pixel lies within 1 standard deviation of any one of the Gaussians in the grid (the edges of the frame are an exception). 9 such grids are created, one for each quantized motion direction.

Figure 8B:
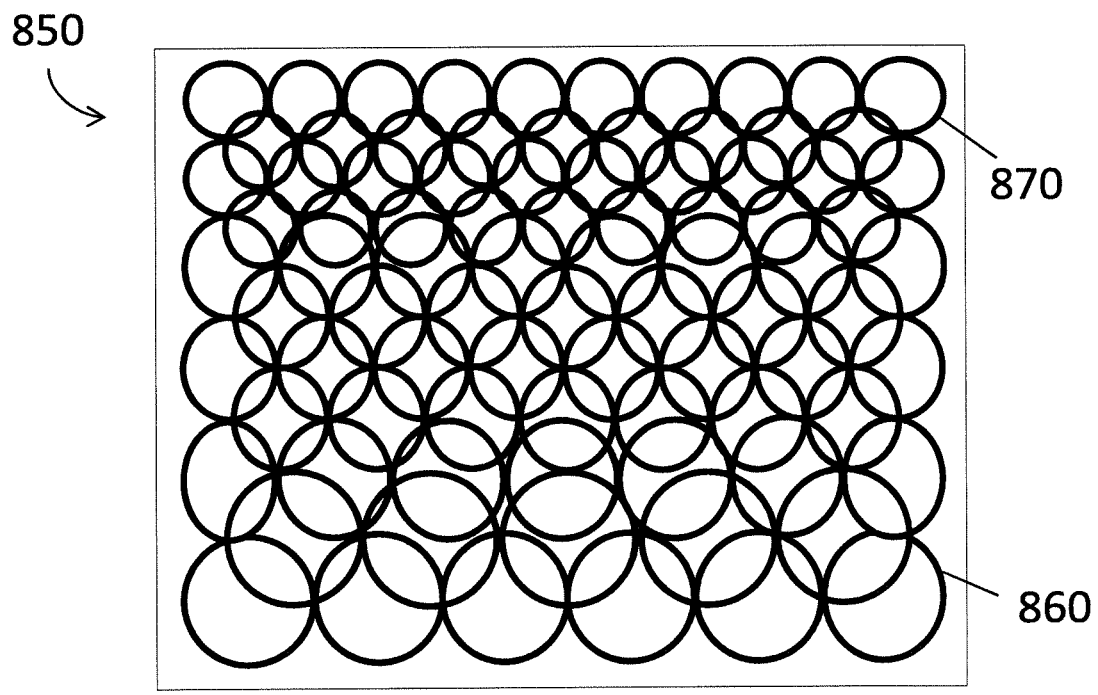

FIG. 8b shows a further example of a default Gaussian grid. The Gaussian grid 850 constructed such that it models the perspective in the scene. If the user can specify perspective information, the grid can be constructed with Gaussians having varying covariance. As shown in FIG. 8b, Gaussians 860 representing regions close to the camera have a larger covariance than Gaussians 870 representing regions further from the camera.

Figure 9:
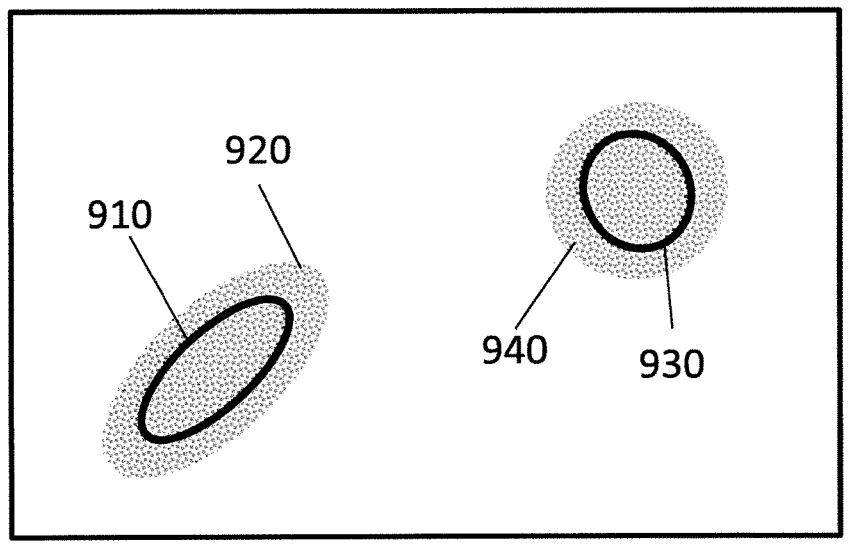
FIG. 9 shows an example of words being mapped to Gaussians.

FIG. 9 shows an example of words being mapped to Gaussians. All words are evaluated for each Gaussian in the training set, and if a word is within 2 standard deviations of the Gaussian, it is mapped to that Gaussian. As shown in FIG. 9, words 920 which are evaluated to be within 2 standard deviations of a first Gaussian 910 are mapped to the first Gaussian 910. Similarly, words 940 which are evaluated to be within 2 standard deviations of a second Gaussian 930 are mapped to the second Gaussian 930. It is noted that the clustering of PLSA-GMMs in previous stages is expected to produce Gaussians that are well separated. Therefore, it is a reasonable approximation to map each word to only one Gaussian.

If a word does not lie within 2 standard deviations of any of the Gaussians from training, it is evaluated for Gaussians in the default grid and the Gaussian that produces highest probability of matching is selected and the word is mapped to this Gaussian. It must be noted that the Gaussians in the default grid are not representative of any seen activity. Thus using these directly to generate motion patterns gives a poor representation of activities. The PLSA-GMM Gaussians on the other hand model actual activity regions. Thus they model features of the object such as size and scene perspective. This extra information is important to get a proper representation of an activity in the scene.

An activity such as a vehicle moving or a pedestrian crossing a road produces a series of words. These words can be reduced to a lower dimensional Gaussian space by the word quantization module 650 using the map generated by the mapping module 640. Thus each video frame generates a set of Gaussians that are used to build motion patterns (or tracks) that model activities in the scene.

This process is carried out by the generate motion patterns module 660 as follows. A motion pattern spanning multiple frames can be broken down into transitions between subsets of frames. A set of frames, for example 5 frames may be termed as a doc, then, the transition between two docs can be modelled as a transition between 2 Gaussians seen in these docs. The validity of a transition in time and space from one Gaussian in a first doc to another Gaussian in a second doc is determined by a pair of validity functions $d_v$ and $o_v$. The functions have a range (0, 1) with values close to 1 indicating valid transitions. The distance based validity function dv ensures that transitions to Gaussians that are physically closer have lower cost and transitions to Gaussians that are further away have much higher costs. This function is designed based on the degree of movement (in terms of pixel distances) possible between two consecutive docs in the scene. The angle based validity function $o_v$ ensures that only those transitions are allowed wherein the average direction of motion of the Gaussians involved in the transition is close to the geometric angle of transition between them.

For $G_i \sim N(\mu_i, \Sigma_i)$ with $\mu_i = (x_i, y_i)$ and $\Sigma_i$ given by the follow formula, $$\sum_i = \begin{pmatrix} \sigma_{xxi} & \sigma_{xyi} \\ \sigma_{yxi} & \sigma_{yyi} \end{pmatrix}$$

Validity function based on distance $d_v$ between two Gaussians $G1 \sim N(\mu_1, \Sigma_1)$ and $G2 \sim N(\mu_2, \Sigma_2)$ in (x, y, dx, dy) space can be based on any one of the following distance measures. It is noted that only the 2 distance related dimensions x, y are used for distance measure calculations.

Euclidean distance factor for a video with resolution W×H is given by:

$$d_{EU} = \sqrt{(\mu_{2x} - \mu_{1x})^2 + (\mu_{2y} - \mu_{1y})^2}$$

$$d_v = 1 - \frac{d_{EU}}{\sqrt{W^2 + H^2}}$$

The Mahalanobis distance is given by:

$$d_{MN} = \sqrt{(\mu_1 - \mu_2)^T \Sigma_2^{-1} (\mu_1 - \mu_2)}$$

$$d_v = \begin{cases} \left(1 - \frac{d_{MN}}{C}\right), & \text{if } \frac{d_{MN}}{C} < 1 \\ 1, & \text{otherwise} \end{cases}$$

The KL distance is given by:

$$d_{KL}(G_1, G_2) = d_{KLN}(f_c(G1), f_c(G2))$$

$$f_c\left(\mu_i, \sum_i\right) = \left(\mu_i, c_{vf} \sum_i\right)$$

$$d_{KLN} = 1 - \frac{1}{\pi}\left[\arctan(\log_{10}(d_{KLS})) + \frac{\pi}{2}\right]$$

$$d_{KLS} = \frac{d_{KLG}(G_1, G_2) + d_{KLG}(G_2, G_1)}{2}$$

$$d_{KLG} = \frac{1}{2}\left[\log\frac{|\Sigma_2|}{|\Sigma_1|} - d + tr\left(\sum_2^{-1}\sum_1\right) + (\mu_2 - \mu_1)^T \sum_2^{-1} (\mu_2 - \mu_1)\right]$$

$$d_v = 1 - d_{KL}$$

The validity function $o_v$ based on the direction of motion may be calculated as follows. The function $o_v$ between two Gaussians $G_1$ and $G_2$ with $G_1 \sim N(\mu_i, \Sigma_i)$ where $\mu_i \in (x, y, \theta_i) = (x_i, y_i, dx_i, dy_i)$, is obtained using the direction measure given by $\mu_{\theta i} = (dx_i, dy_i)$ and location measure given by $\mu_i = (x_i, y_i)$:

$$d_{OF} = \begin{cases} 0 & \text{if } |dx_i| < 0 \text{ and } |dy_i| < 0 \text{ for either } G_1 \text{ or } G_2 \\ d_{OFvalid} & \text{otherwise} \end{cases}$$

Note that $d_{OF}$ is set to 0 as we are only considering objects in motion and thus transition from/to/between static Gaussians is considered invalid. Allowing such transitions will generate lot of outliers as transitions to regions with light intensity changes and other such static background activities will get connected to tracks.

$$d_{OFvalid} = d_{OFvec} \times d_{OFdiff}$$

$$d_{OFdiff} = [\pi - diff(\theta_1, \theta_2)]\frac{1}{\pi}$$

$$d_{OFvec} = [\pi - |diff(d_{OFavg}, d_{OFgeo})|]\frac{1}{\pi}$$

$$d_{OFavg} = avg(\theta_1, \theta_2)$$

$$d_{OFgeo} = geo(\mu_1, \mu_2)$$

$$diff(\theta_1, \theta_2) = \arccos(\cos\theta_1 \cos\theta_2 + \sin\theta_1 \sin\theta_2)$$

$$avg(\theta_1, \theta_2) = \begin{cases} \alpha, & \text{if } \alpha > 0 \\ \alpha + 2\pi & \text{otherwise} \end{cases}$$

with $\alpha$ given by:

$$\alpha(\theta_1, \theta_2) = \arctan2\left(\frac{\sin\theta_1 + \sin\theta_2}{2}, \frac{\cos\theta_1 + \cos\theta_2}{2}\right)$$

$$geo(\mu_1, \mu_2) = \begin{cases} \alpha, & \text{if } \alpha > 0 \\ \alpha + 2\pi & \text{otherwise} \end{cases}$$

with $\alpha$ given by:

$$\alpha(\mu_1, \mu_2) = \arctan2(y_2 - y_1, x_2 - x_1), \text{ for } \mu_i = (x_i, y_i)$$

After all valid transitions between doc pairs are obtained, for a scene comprising a series of docs we link the transition units (tracklets) to form tracks in the generate motion patterns module 660.

Each tracklet is represented by a pair of Gaussians $G_i$-$G_j$. A track formed by linking tracklets is in the form $G_1$-$G_2$-$G_3 \ldots G_n$.

The generate motion patterns module 660 may implement the following algorithm to build tracks.

1. Add 1st tracklet to track-list.
2. For each new tracklet $G_i$-$G_j$ check if $G_i$ is the last Gaussian in any of the tracks in track-list. If so add $G_j$ at the end of this track. If not add $G_i$-$G_j$ as a new track to track-list.
3. Remove short loops and jitter.

The track generation process can generate few hundred thousand tracks from an hour of video. Thus we need a running clustering process to model the system using much fewer tracks. For each scene (frames from few seconds of video), tracks are generated and clustered to get a reduced set of tracks $L_r$. The frequency count of these tracks model the distribution of activity in the scene. The learning process runs in real-time with 1 scene delay.

The build statistical model module 670 may implement the following algorithm.

Tracks generated for one scene are received from generate motion patterns module 660. Each new track is compared with tracks in $L_r$. If it matches, increment frequency count of the track in $L_r$. Else store the new track in a temporary track-list $L_t$ of max length $N_t$. If new track is the same as one of the tracks in $L_t$, increase its priority counter by 1. Else add track to $L_t$. If $L_t$ is full, replace the tracks with least priority in $L_t$ with the new tracks. Priority value for a new track is equal to the priority of the track with least priority+1. This ensures that new tracks enter the list, but their potential to stay in the list depend on how frequently they appear. Tracks that appear frequently over a longer time frame move to the top of the list. Tracks that appear in short bursts and appear no more move lower and may get replaced. Every t scenes, merge tracks with highest similarity in $L_r$ and add top tracks from $L_t$ to $L_r$ in these vacant slots.

The tracks are compared using a similarity function described below. If the most similar tracks in $L_r$ have a similarity value greater than a threshold, then they are not merged and instead the top tracks are added directly to $L_r$. Track merge may also be prevented when covariance of any Gaussian in the merged track exceeds a maximum limit. Repeat all the above steps until the end of the training video to get a final set of tracks that model the activities in the scene. At the end of training, normalize the frequency count of merged tracks in $L_r$ to get a probability model of activity distribution in the video.

The track comparison may be implemented as follows. A track $T=t_1, t_2 \ldots t_y$ is made up of a series of Gaussians $t_1$. The similarity measure $s_{12}$ between two tracks $T_1$ and $T_2$ is obtained by using a modified edit distance method, with custom built cost functions that depend on properties of Gaussians being compared. The edit distance gives the cost of transforming track $T_1$ to $T_2$. Three operations insert, delete and substitute are possible. The cost for each operation is given by:

$$d_{i,j} = \min \begin{cases} d_{i-1,j} + cd(t_{1i}, t_{2j+1}) & \text{(for insert)} \\ d_{i,j-1} + cd(t_{1i+1}, t_{2j}) & \text{(for delete)} \\ d_{i-1,j-1} + cd(t_{1i}, t_{2j}) & \text{(for substitute)} \end{cases}$$

where, $cd(t_{1i}, t_{2j})$ is given by any of the distance measures KL distance, Euclidean distance, and Mahalanobis distance which are described above.

Using a backtrace algorithm, the optimal alignment of operations $A_{12}$ for transformation is obtained. Once alignment $A_{12}$ is obtained the similarity measure between tracks $T_1 = t_{11}, t_{12} \ldots t_{1y}$ and $T_2 = t_{21}, t_{22} \ldots t_{2z}$ is calculated using distance cost cd and angle cost ca by:

$$s_{12} = 1 - \frac{\sum_{m=1}^{M} \max(cd(t_{1f1(m)}, t_{2f2(m)}), ca(t_{1f1(m)}, t_{2f2(m)}))}{M}$$

Where, M is the length of $A_{12}$, and $$f1(m+1), f2(m+1) = \begin{cases} f1(m), f2(m)+1 & \text{if } A_{12}(m) = \text{insert} \\ f1(m)+1, f2(m) & \text{if } A_{12}(m) = \text{delete} \\ f1(m)+1, f2(m)+1 & \text{if } A_{12}(m) = \text{substitute} \end{cases}$$

with $f1(0) = 0$ and $f2(0) = 0$

The angle cost function $ca(t_{1i}, t_{2j})$ is obtained by a combination of average optical flow angle of the Gaussians and the geometric angle of transition between current and previous Gaussians in the track. For Gaussians $t_{1i}$ and $t_{2j}$, with average optical flow angle $\theta_1$ and $\theta_2$:

$$ca = \frac{d_{OFdiff} + d_{GAdiff}}{2}$$

$$d_{OFdiff} = \frac{diff(\theta_1, \theta_2)}{\pi}$$

$$d_{GAdiff} = \frac{diff(\phi_1, \phi_2)}{\pi}$$

$$diff(\theta_1, \theta_2) = \arccos(\cos\theta_1 \cos\theta_2 + \sin\theta_1 \sin\theta_2)$$

$$\phi_k = geo(\mu_{ki}, \mu_{k(i-1)})$$

$$geo(\mu_1, \mu_2) = \begin{cases} \alpha, & \text{if } \alpha > 0 \\ \alpha + 2\pi & \text{otherwise} \end{cases}$$

with $\alpha$ given by:

$$\alpha(\mu_1, \mu_2) = \arctan2(y_2 - y_1, x_2 - x_1), \text{ for } \mu_i = (x_i, y_i)$$

To merge tracks $T_1$ and $T_2$, the optimal alignment of operations $A_{12}$ between them is obtained as described above. The merged track $T_m = t_{m1}, t_{m2} \ldots t_{mM}$ with length M equal to the length of $A_{12}$ is obtained using the function:

$$t_{mk} = \begin{cases} t_{1k} & \text{if } t_{1k} = t_{2k} \\ \text{merge}(t_{1k}, t_{2k}) & \text{if } t_{1k} \neq t_{2k} \text{ and } A_{12}(m) = \text{substitute} \\ \text{merge}(t_{2k}, t_{m(k-1)}) & \text{if } A_{12}(m) = \text{insert and } k \neq 1 \\ \text{merge}(t_{1k}, t_{m(k-1)}) & \text{if } A_{12}(m) = \text{delete and } k \neq 1 \\ \text{merge}(t_{2k}, t_{1k}) & \text{if } A_{12}(m) = \text{insert and } k = 1 \\ \text{merge}(t_{1k}, t_{2k}) & \text{if } A_{12}(m) = \text{delete and } k = 1 \end{cases}$$

For two Gaussians $t_{1k} \sim N(\mu_1, \Sigma_1)$ and $t_{2k} \sim N(\mu_2, \Sigma_2)$, the merged Gaussian is given by $t_{mk} \sim N(\mu_m, \Sigma_m)$ where:

$$\mu_m = \frac{\mu_1 + \mu_2}{2}$$

$$\sum_m = \frac{(\mu_1^2 + \sum_1) + (\mu_2^2 + \sum_2)}{2} - \mu_m^2$$

As described above, the training process produces a reduced set of merged tracks. Words are remapped to the Gaussians corresponding to these tracks. The mapping process is same as described above with reference to the mapping module 640 but with the track-Gaussians in addition to the PLSA-GMM Gaussians being used. This train-map along with train-tracks are used during detection of abnormalities.

In an embodiment, an on-line training procedure that adapts dynamically to the new activities in the scene is implemented.

Figure 10:
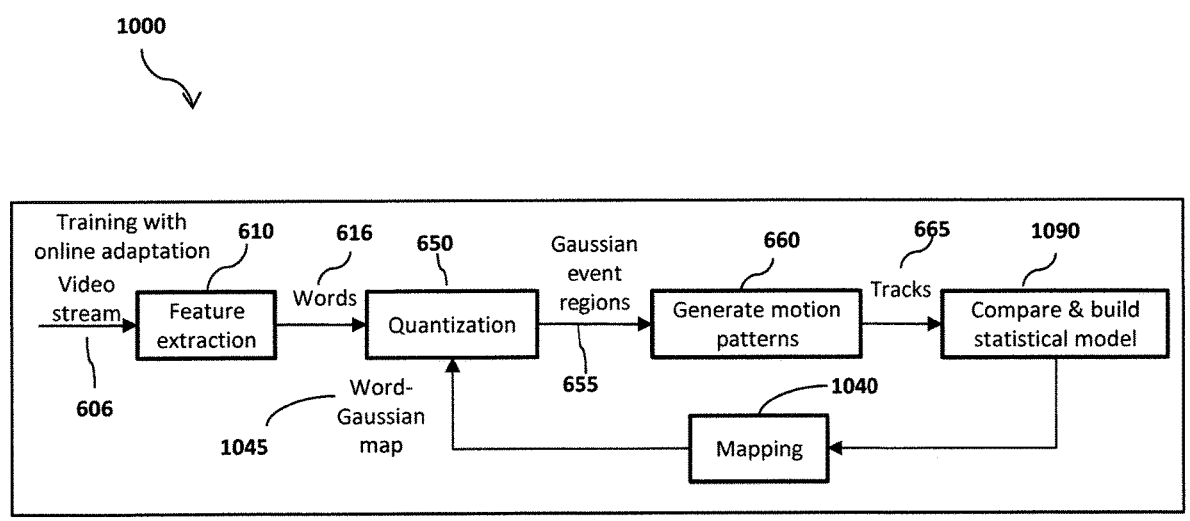
FIG. 10 shows an implementation of adaptive training which may be used with embodiments of the present invention.

FIG. 10 shows an implementation of adaptive training which may be used with embodiments of the present invention. The adaptive training system 1000 shown in FIG. 10 is configured to adapt the statistical model using the test video stream 606. The system 1000 includes a feature extraction module 610, a quantization module 650 and a generate motion patterns module 660 which function in the same manner as the corresponding modules described above in relation to FIG. 6.

As described above, the scene track model comprises of a set of learned train-tracks with a probability distribution modelling their frequency of occurrence. The system 100 shown in FIG. 10 includes an additional compare & build statistical model module 1090 which compares each new-track with the train-tracks that are part of the temporary scene track model. If it is significantly different, the new track is added to the list of train-tracks.

Additionally, as the train-track list and the scene track model get modified continuously, the mapping of words to the new Gaussians being formed needs to be modified as well. This is performed by a mapping module 1040 in the feedback loop. Thus with this system, learning can be accomplished fully on-line using a live video stream.

Once the scene track model is learnt, the system can be used to detect abnormal events from a live video stream. Detection of abnormality runs in real-time with 1 scene delay. The track generation process is similar to the process described above in relation to FIG. 6. The train-map is used for track generation.

Each track generated during detection (test-track) is compared with the reference set of all train-tracks. Train-tracks with very low probability in the scene track model are excluded from the reference set.

The similarity measure s12 between a test-track $T_1$ and a train-track $T_2$ is obtained by using a modified edit distance method similar to the method described in training, but with asymmetric costs for delete, insert and substitute operations.

The cost for each insert, delete and substitute operations is given by:

$$d_{i,j} = \min \begin{cases} d_{i-1,j} + cd(t_{1i}, t_{2j+1}) & \text{(for insert)} \\ d_{i,j-1} + cd(t_{1i+1}, t_{2j}) & \text{(for delete)} \\ d_{i-1,j-1} + cd(t_{1i}, t_{2j}) & \text{(for substitute)} \end{cases}$$

where, $cd(t_{1i}, t_{2j})$ is given by a distance measure such as KL distance, Euclidean distance, Mahalanobis distance described above.

Using a backtrace algorithm, the optimal alignment of operations $A_{12}$ for transformation is obtained. Once alignment $A_{12}$ is obtained the similarity measure between tracks $T_1 = t_{11}, t_{12} \ldots t_{1y}$ and $T_2 = t_{21}, t_{22} \ldots t_{2z}$ is calculated using a distance cost cd and an angle cost ca by:

$$s_{12} = 1 - \frac{\sum_{m=1}^{M} \max(cd(t_{1f1(m)}, t_{2f2(m)}), ca(t_{1f1(m)}, t_{2f2(m)}))}{M}$$

where, M is length of $A_{12}$ and $$f1(m+1), f2(m+1) = \begin{cases} f1(m), f2(m)+1 & \text{if } A_{12}(m) = \text{insert} \\ f1(m)+1, f2(m) & \text{if } A_{12}(m) = \text{delete} \\ f1(m)+1, f2(m)+1 & \text{if } A_{12}(m) = \text{substitute} \end{cases}$$

with $f1(0)=0$ and $f2(0)=0$.

The cost functions cd and ca are asymmetric as described below:

$$c(t_{1f1(m)}, t_{2f2(m)}) = \begin{cases} c(t_{1f1(m)}, t_{2f2(m)}) & \text{if } A_{12}(m) = \text{delete or swap} \\ 0 & \text{if } A_{12}(m) = \text{insert} \end{cases}$$

This asymmetry is to ensure that test-tracks that match completely with a portion of a train-track is a good match and has no cost. There is no penalty for insert as we are trying to convert a test-track to a train-track using the edit distance method. On the other hand, a test-track that matches with only a portion of the train-track must have high cost.

In an embodiment, the classifier module 680 operates as follows. Each test-track is compared with each of the train-tracks to find the most similar track. A binary classifier implemented in the classifier module is used to determine if a test-track is Abnormal or not. The cost of matching the test-track with its best match train-track is given by $$c_{12} = 1 - s_{12}$$

where, $s_{12}$ is the similarity measure between the test-track and most similar train-track. If $c_{12}$ is greater than the Abnormality threshold, the test-track is Abnormal. The Abnormality threshold can be set by looking at similarity values obtained during training and can be set to a value close to the highest matching cost seen during training.

The systems described above may be implemented as an independent abnormality detection system. For example, a system that can raise an alarm when an abnormal event occurs in the scene. Once the training phase 602 is complete and we have a scene track model, the detection phase 604 for detecting abnormalities can run in real-time. Tracks generated in real-time during the detection phase are compared with the train-tracks. Abnormal activities in the video are determined by checking how dissimilar a test-track is with respect to the train-tracks. If the dissimilarity is significantly high, that track and in turn the activity it models is abnormal.

As a real-world activity can end up being modelled by more than one track, we collect all abnormal tracks in the scene and cluster them to get an estimate of the actual number of abnormal events in the scene. Alarms are raised and logged accordingly.

In an embodiment, the systems described above are used in combination with a rule based video analysis system. Such an implementation can reduce the number of false alarms in the rule based system.

Figure 11:
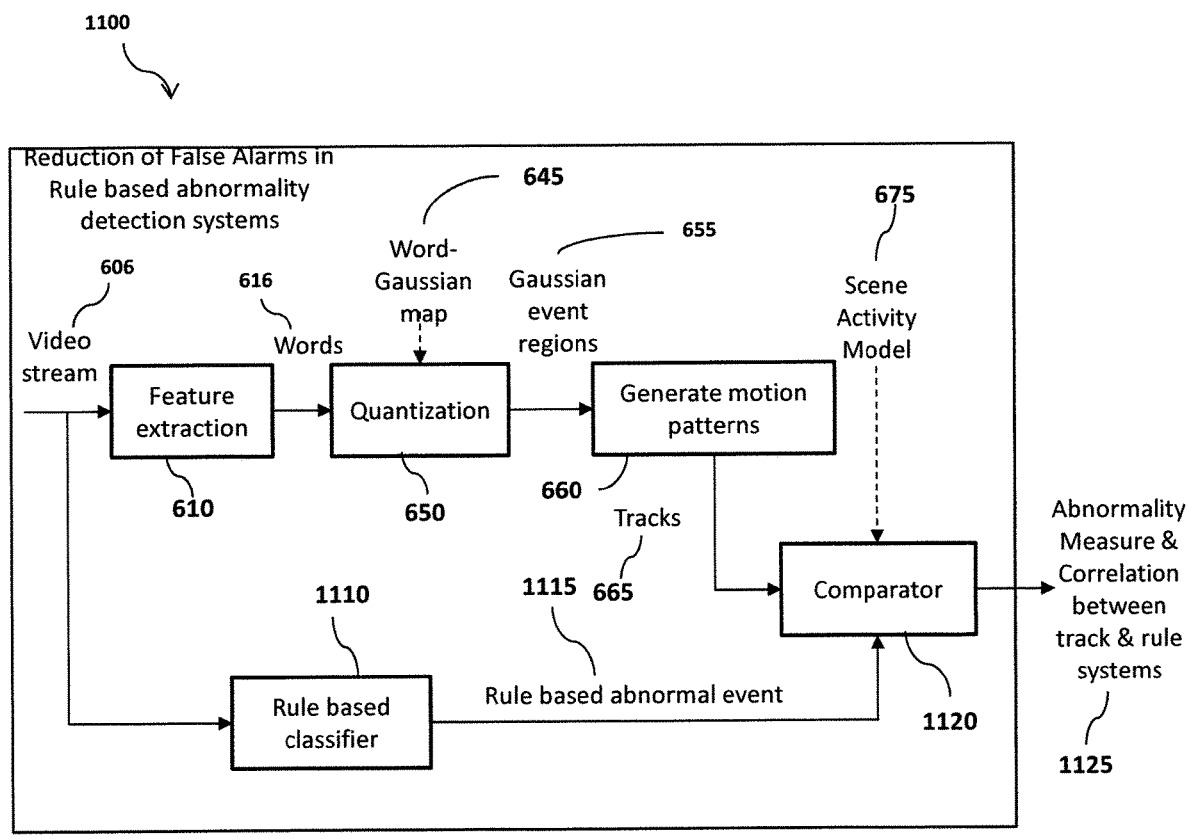
FIG. 11 shows a video analysis system that combines a rule based analysis with a statistical analysis according to an embodiment of the present invention.

FIG. 11 shows a video analysis system that combines a rule based analysis with a statistical analysis. The system 1100 has two pipelines of operation, one for the track generation process and one for the rule based abnormality detector process. The pipeline for the track generation process comprises a feature extraction module 610, a quantization module 650 and a generate motion patterns module 660 which function as described above with reference to FIG. 6. The track generation process generates tracks 665 from an input video stream 606.

The input video stream 606 is also analysed by a rule based classifier 1110. The rule based detection process runs in parallel using the same input video stream 606. The rule based classifier 1110 detects events satisfying pre-defined rules. For example, detecting cars crossing a line. The rule based classifier 1110 will trigger an alarm whenever such an event occurs. But these alarms could be false due to other objects such as headlights (activities that trigger intensity change and generate motion patterns in the scene).

As shown in FIG. 11, the rule based classifier 1110 outputs indications of rule based abnormal events 1115. The indications of rule based abnormal events 1115 and the tracks 665 are input into a comparator module 1120 which analyses the two inputs using the scene activity model 675. The comparator module 1120 outputs an abnormality measure and correlation between track and rule systems 1125.

The comparator module 1120 is used to correlate the rule based abnormal event indications 1115, with the track 665 generated from the track generation process. A goodness of fit measure is used to get a quantitative representation of how well the rule based event maps to the tracks.

Frequently occurring tracks corresponding to false trigger events can be marked by the user. If the rule based event shows a good fit to these marked tracks, then alarms produced by such events can be suppressed, thus improving the accuracy of the system for detection of events matching rules.

A rule based classifier and comparator may also be added to the embodiment shown in FIG. 2.

Whilst the foregoing description has described exemplary embodiments, it will be understood by those skilled in the art that many variations of the embodiment can be made within the scope and spirit of the present invention.

The invention claimed is:

1. A method of identifying abnormal events in a video sequence, the method comprising:
   extracting features from the video sequence;
   determining motion patterns from the extracted features by identifying tracklets between pairs of frames of the video sequence, and linking the tracklets between successive pairs of frames the video sequence to form tracks, the motion patterns comprising tracks, each track spanning a plurality of frames of the video sequence;

determining an abnormality measure for each motion pattern by comparing the motion patterns with a statistical model; and identifying an abnormal event using the abnormality measure.

2. A method according to claim 1, further comprising quantizing the extracted features.

3. A method according to claim 1, further comprising updating the statistical model using the motion patterns.

4. A method according to claim 1, wherein identifying an abnormal event using the abnormality measure comprises comparing the abnormality measure with a threshold and identifying an abnormal event when the abnormality measure is greater than the threshold.

5. A method according to claim 1, wherein the statistical model comprises a set of clustered motion patterns.

6. A method according to claim 5, wherein determining an abnormality measure for each motion pattern by comparing the motion patterns with a statistical model comprises identifying a set of clustered motion patterns of the statistical model closest to the motion pattern.

7. A method according to claim 6, wherein the abnormality measure for the respective motion pattern is a distance measure between the set of clustered motion patterns closest to the motion pattern and the motion pattern.

8. A method according to claim 1, wherein the features are optical flow.

9. A method according to claim 1, further comprising detecting an event according to a pre-defined rule and wherein identifying an abnormal event comprises using the abnormality measure and the result of the pre-defined rule.

10. A non-transitory computer readable carrier medium carrying processor executable instructions which when executed on a processor cause the processor to carry out a method according to claim 1.

11. An apparatus for identifying abnormal events in a video sequence, the apparatus comprising:

a computer processor and a data storage device, the data storage device having a feature extraction module; and a motion pattern generation module and a classifier module comprising non-transitory instructions operative by the processor to:

extract features from the video sequence;

determine motion patterns from the extracted features by identifying tracklets between pairs of frames of the video sequence and linking the tracklets between successive pairs of frames the video sequence to form tracks, the motion patterns comprising tracks, each track spanning a plurality of frames of the video sequence;

determine an abnormality measure for each motion pattern by comparing the motion patterns with a statistical model; and identify an abnormal event using the abnormality measure.

12. An apparatus according to claim 11, the data storage device further comprising a quantization module comprising non-transitory instructions operative by the processor to: quantize the extracted features.

13. An apparatus according to claim 11, the data storage device further comprising a compare and build statistical model module comprising non-transitory instructions operative by the processor to: update the statistical model using the motion patterns.

14. An apparatus according to claim 11, wherein the classifier module comprises non-transitory instructions operative by the processor to: identify an abnormal event using the abnormality measure by comparing the abnormality measure with a threshold and identifying an abnormal event when the abnormality measure is greater than the threshold.

15. An apparatus according to claim 11, wherein the statistical model comprises a set of clustered motion patterns.

16. An apparatus according to claim 15, wherein the classifier module comprises non-transitory instructions operative by the processor to: determine an abnormality measure for a respective motion pattern by identifying a set of clustered motion patterns of the statistical model closest to the respective motion pattern.

17. An apparatus according to claim 16, wherein the abnormality measure for the respective motion pattern is a distance measure between the set of clustered motion patterns closest to the respective motion pattern and the respective motion pattern.

18. An apparatus according to claim 11, wherein the features are optical flow.

19. An apparatus according to claim 11, wherein the storage device further comprises a rule based classifier module comprising non-transitory instructions operative by the processor to: detecting an event according to a pre-defined rule and wherein identifying an abnormal event comprises using the abnormality measure and the result of the pre-defined rule.

* * * * *